(12) United States Patent
Diachina et al.

(10) Patent No.: US 8,374,133 B2
(45) Date of Patent: Feb. 12, 2013

(54) SHARED UPLINK NOTIFICATION BURSTS (SUNB)

(75) Inventors: John Diachina, Garner, NC (US);
Bogdan Sutkowski, Apex, NC (US);
Paul Schliwa-Bertling, Ljungsbro (SE);
Marten Sundberg, Stockholm (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 752 days.

(21) Appl. No.: 12/511,775

(22) Filed: Jul. 29, 2009

(65) Prior Publication Data
US 2010/0203895 A1 Aug. 12, 2010

Related U.S. Application Data

(60) Provisional application No. 61/150,358, filed on Feb. 6, 2009.

(51) Int. Cl.
*H04W 4/00* (2009.01)
(52) U.S. Cl. ............ 370/329; 370/341; 370/395.3; 370/395.4; 370/437; 455/450; 455/509

(58) Field of Classification Search .......... 370/328, 370/329, 341, 395.3, 437, 395.4; 455/450, 455/509
See application file for complete search history.

(56) References Cited

U.S. PATENT DOCUMENTS

| | | | |
|---|---|---|---|
| 6,747,962 B2 * | 6/2004 | Lintulampi et al. | 370/329 |
| 8,218,494 B2 * | 7/2012 | Conway et al. | 370/329 |
| 2008/0151828 A1 * | 6/2008 | Bjorken et al. | 370/329 |
| 2008/0176576 A1 | 7/2008 | Diachina et al. | |

* cited by examiner

*Primary Examiner* — Christopher Grey

(57) ABSTRACT

A mobile station (MS) operating within a radio network includes a processing unit having an active mode and an inactive mode. The mobile station includes a transmitter in communication with the processing unit. The mobile station includes a memory in communication with the processing unit for storing uplink payload. The mobile station includes a radio interface in communication with the radio network and the transmitter; when there is uplink payload to transmit when the processing unit is in the inactive mode, the transmitter transmitting an activity indication to a base station over the radio interface, the processing unit changing to active mode, and the transmitter transmitting the uplink payload to the base station over the radio interface. A method for a mobile station operating within a radio network. A method for a base station operating within a radio network.

4 Claims, 4 Drawing Sheets
SHARED UPLINK NOTIFICATION BURSTS (SUNB)

CROSS-REFERENCE TO RELATED APPLICATIONS

This application claims the benefit of U.S. Provisional Application No. 61/150,358, filed Feb. 6, 2009, the disclosure of which is incorporated herein by reference.

TECHNICAL FIELD

The present invention is related to a shared USF utilized by multiple mobile stations to more efficiently allocate uplink bandwidth. (As used herein, references to the "present invention" or "invention" relate to exemplary embodiments and not necessarily to every embodiment encompassed by the appended claims.) More specifically, the present invention is related to a shared USF utilized by multiple mobile stations to more efficiently allocate uplink bandwidth whereby the multiple mobile stations may be assigned a shared USF value such that when choosing to respond to such a shared USF, each mobile station uses one or more predefined symbol segments within the overall symbol space of a plurality of uplink bursts, to send the base station an indication that serves to uniquely identify that it has an uplink packet service that has once again become active.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The present invention is based on the case where there may be mobile stations in any given cell where each mobile station (MS) has one or more ongoing uplink packet services which are delay sensitive in nature. The specific scenario addressed is where one or more of these mobile stations has become inactive (i.e. a mobile station is in packet transfer mode but there is currently no uplink payload to send) and the BSS (base station subsystem or simply base station) has responded to this inactivity by significantly reducing the frequency of the dedicated USF(s) assigned to each of these mobile stations. These inactive mobile stations may become active at any moment due to additional uplink payload becoming available within the mobile station (MS). The challenge with the BSS managing such inactive mobile stations is that it must still provide them with a significant number of dedicated USF (Uplink State Flag) based transmission opportunities so as to ensure the delay experienced in resuming the transmission of their uplink packet services is minimized (i.e. the delay requirement for sending uplink payload associated with such services must not be violated when an inactive mobile station becomes active again).

BRIEF SUMMARY OF THE INVENTION

The present invention pertains to a mobile station (MS) operating within a radio network. The mobile station comprises a transmitter in communication with the radio interface. The mobile station comprises a processing unit having an active mode and an inactive mode. The mobile station comprises a transmitter in communication with the processing unit. The mobile station comprises a memory in communication with the processing unit for storing uplink payload. The mobile station comprises a radio interface in communication with the radio network and the transmitter; when the processing unit is inactive mode and determines there is uplink payload to transmit, the transmitter being requested by the processing unit to transmit an activity indication to a base station over the radio interface, the processing unit changing its mode to active mode, and the transmitter transmitting the uplink payload to the base station over the radio interface using uplink transmission opportunities provided by the reception of a dedicated USF value assigned to that mobile station.

The invention pertains to a base station (BS) of a radio network. The base station comprises a processing unit which assigns a shared Uplink State Flag (USF) value common to all mobile stations capable of shared USF operation, requiring the use of shared USF operation for an uplink temporary block flow (TBF) and having at least one common uplink timeslot for their respective uplink TBFs, and which assigns one or more unique predefined symbol segments within an overall symbol space of a plurality of uplink SUN (shared uplink notification) bursts associated with the shared USF unique to each mobile station within a plurality of mobile stations assigned the use of the same shared USF value. The base station comprises a transmitter and receiver in communication with the processing unit. The base station comprises a radio interface in communication with the transmitter that transmits the identity of the unique predefined symbol segment(s), dedicated USF value and shared USF value to each mobile station within a plurality of mobile stations assigned the use of the same shared USF value as part of the signaling procedures performed for initial establishment or ongoing maintenance of an uplink TBF.

The present invention pertains to a method for a mobile station operating within a radio network. The method comprises the steps of placing a processing unit of the mobile station into an inactive mode. There is the step of transmitting an indication to a base station over the radio interface of the mobile station that there is new uplink payload to transmit. There is the step of changing the processing unit of the mobile station to active mode as a result of determining that there is new uplink payload to transmit. There is the step of transmitting the uplink payload to the base station over the radio interface of the mobile station.

The present invention pertains to a method for a base station of a radio network. The method comprises the steps of assigning by a processing unit of the base station a shared USF value common to all mobile stations capable of shared USF operation, requiring the use of shared USF operation for an uplink temporary block flow (TBF) and having at least one common uplink timeslot for their respective uplink TBFs. There is the step of assigning by a processing unit of the base station one or more unique predefined symbol segments within an overall symbol space of a plurality of uplink SUN bursts associated with a shared Uplink State Flag (USF) to each mobile station within a plurality of mobile stations assigned the use of the same shared USF value. There is the step of transmitting over the radio interface of the base station the identity of the unique predefined symbol segment(s), the dedicated USF value and shared USF value to each mobile station within a plurality of mobile stations assigned the use of the same shared USF value as part of the signaling procedures performed for initial establishment or ongoing maintenance of an uplink TBF. There is the step of completing the signaling procedures required for initial establishment or ongoing maintenance of an uplink TBF and then transmitting a shared USF value to schedule an opportunity for each mobile station within a plurality of mobile stations assigned the use of that shared USF value to send an activity indication.

The present invention pertains to a mobile station (MS) operating within a radio network. The mobile station comprises a transmitter in communication with a radio interface. The mobile station comprises a processing unit having an active mode and an inactive mode. The mobile station comprises a transmitter in communication with the processing unit. The mobile station comprises a memory in communication with the processing unit for storing uplink payload. The mobile station comprises a radio interface in communication with the radio network and the transmitter; when there is uplink payload to transmit when the processing unit is in the inactive mode, the transmitter transmitting an activity indication to a base station over the radio interface consisting of one or more unique predefined symbol segment(s) transmitted upon receiving the shared USF value assigned to that mobile station, the processing unit changing to active mode, and the transmitter transmitting the uplink payload to the base station over the radio interface using uplink transmission opportunities provided by the reception of a dedicated USF value assigned to that mobile station.

The invention pertains to a base station (BS) of a radio network. The base station comprises a processing unit which assigns a shared Uplink State Flag (USF) value common to all mobile stations capable of shared USF operation, requiring the use of shared USF operation for an uplink temporary block flow (TBF) and having at least one common uplink timeslot for their respective uplink TBFs, and which assigns one or more unique predefined symbol segments within an overall symbol space of a plurality of uplink SUN bursts associated with the shared USF to each mobile station within a plurality of mobile stations assigned the use of the same shared USF value. The base station comprises a transmitter and receiver in communication with the processing unit. The base station comprises a radio interface in communication with the transmitter that transmits the identity of the unique predefined symbol segment(s), dedicated USF value and shared USF value to each mobile station within a plurality of mobile stations assigned the use of the same shared USF value as part of the signaling procedures performed for initial establishment or ongoing maintenance of an uplink TBF. The base station comprises a radio interface in communication with the transmitter that, after completing the signaling procedures required for initial establishment or ongoing maintenance of an uplink TBF, transmits a shared USF value to schedule an opportunity for each mobile station within a plurality of mobile stations assigned the use of that shared USF value to send an activity indication. The base station comprises a radio interface in communication with the receiver that, after the transmitter has scheduled an opportunity for mobile stations to send an activity indication, receives unique predefined symbol segment(s) from one or more mobile stations within a plurality of mobile stations assigned the use of the same shared USF value.

BRIEF DESCRIPTION OF THE DRAWINGS

In the accompanying drawings, the preferred embodiment of the invention and preferred methods of practicing the invention are illustrated in which.

DETAILED DESCRIPTION OF THE INVENTION

Figure 4:
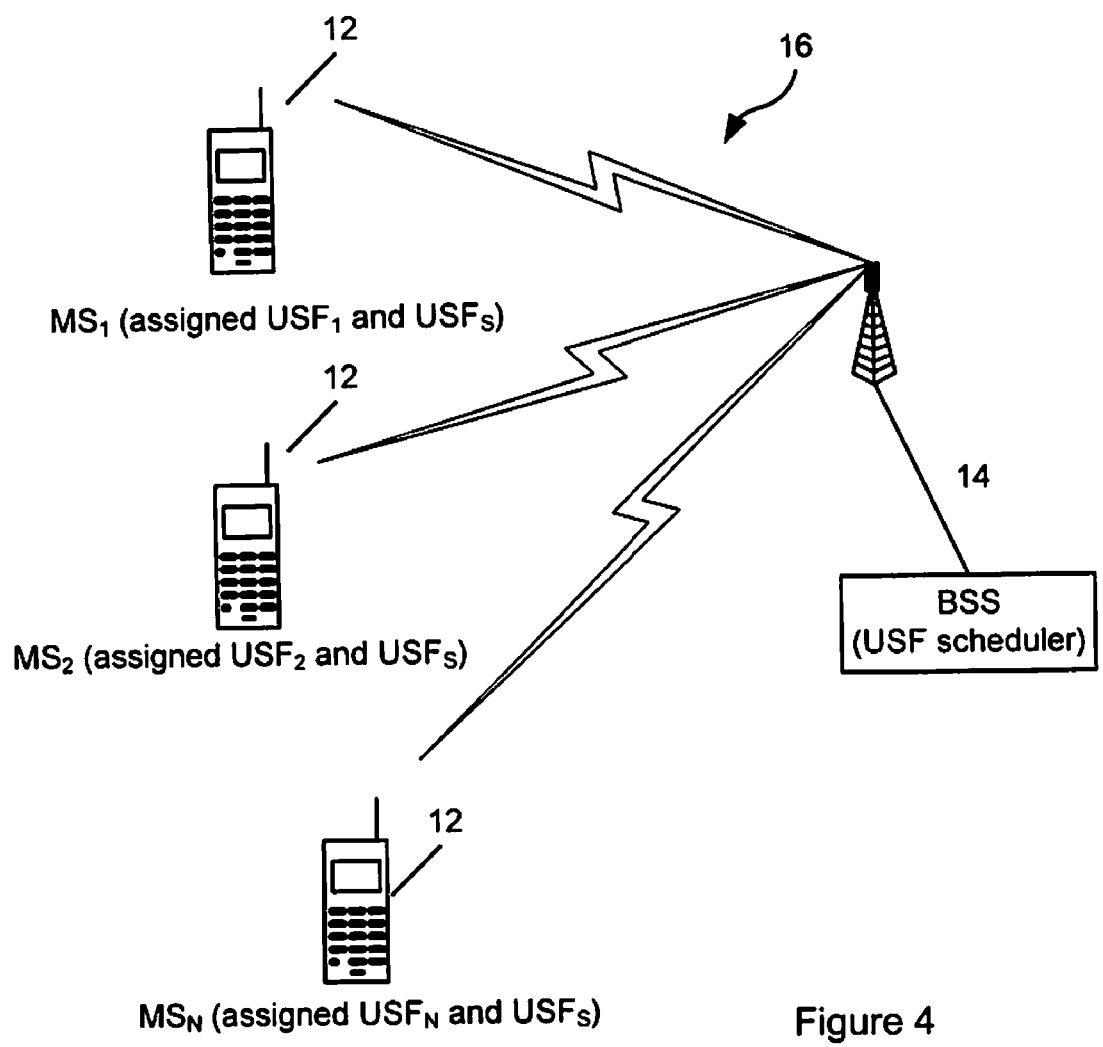
FIG. 4 is a representation of USF scheduling between the base station and the plurality of mobile stations of the present invention
Figure 5:
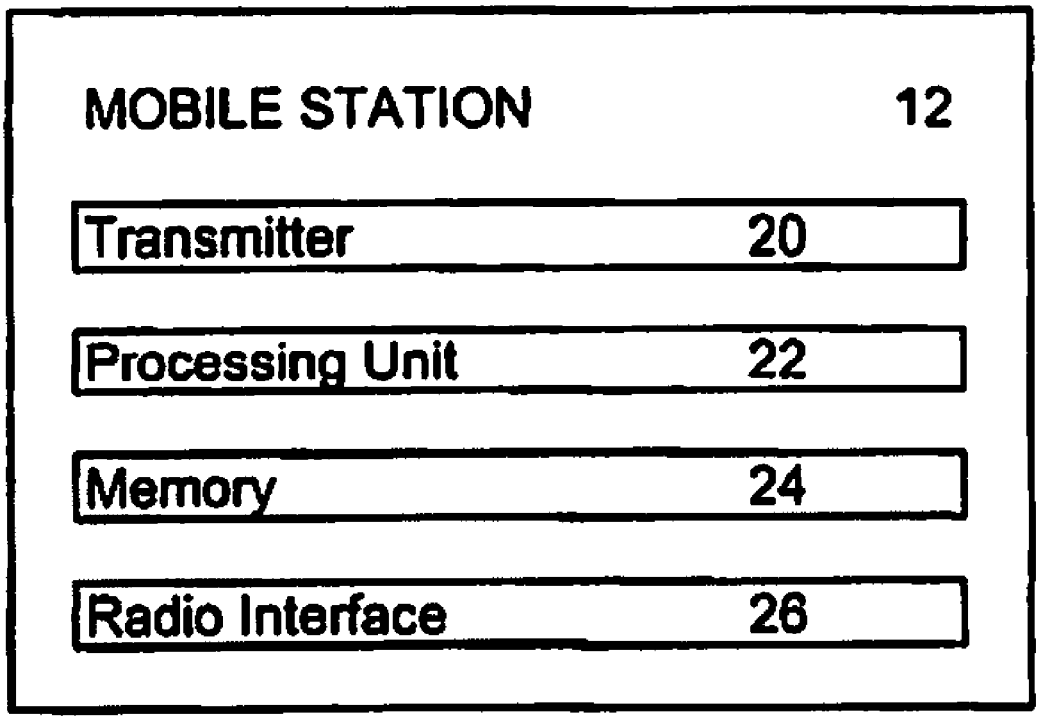
FIG. 5 is a block diagram of a mobile station of the present invention.

Referring now to the drawings wherein like reference numerals refer to similar or identical parts throughout the several views, and more specifically to FIGS. 4 and 5 thereof, there is shown a mobile station (MS) 12 operating within a radio network 16. The mobile station comprises a transmitter 20 in communication with the radio interface. The mobile station comprises a processing unit 22 having an active mode and an inactive mode in communication with the transmitter 20. The mobile station comprises a memory 24 in communication with the processing unit 22 for storing uplink payload. The mobile station comprises a radio interface 26 in communication with the radio network 16. When the processing unit 22 determines there is uplink payload to transmit when in the inactive mode, it requests the transmitter 20 to transmit an activity indication to a base station over the radio interface, changes to active mode, and subsequently requests the transmitter 20 to transmit the uplink payload to the base station over the radio interface.

The radio interface 26 may receive a shared Uplink State Flag (USF) value and convey it to the processing unit 22 to determine if the shared USF is allocated to the mobile station, if its reception is enabled and there is uplink payload available for transmission. The processing unit 22 may enter active mode and request the transmitter 20 to transmit an activity indication over the radio interface 26 using one or more predefined symbol segments within an overall symbol space of a plurality of uplink SUN bursts associated with the shared USF. The radio interface 26 may receive a dedicated uplink State Flag (USF) value and convey it to the processing unit 22 to determine if the dedicated USF is allocated to the mobile station and there is uplink payload available for transmission. The processing unit 22 may disable reception of the shared USF and request the transmitter 20 to transmit uplink payload through the radio interface 26 using a radio block carrying uplink payload according to legacy USF operation. The transmission of an activity indication by the transmitter 20 over the radio interface 26 of the mobile station is also known as the transmission of one or more pre-assigned symbol segments using one or more Shared Uplink Notification Bursts and is used to trigger resumption of legacy (dedicated) USF scheduling by the base station. Disabling the reception of a shared USF means that the processing unit 22 within a given mobile station will not request the transmitter 20 to transmit an activity indication over the radio interface 26 upon reception of a shared USF assigned to that mobile station.

Figure 6:
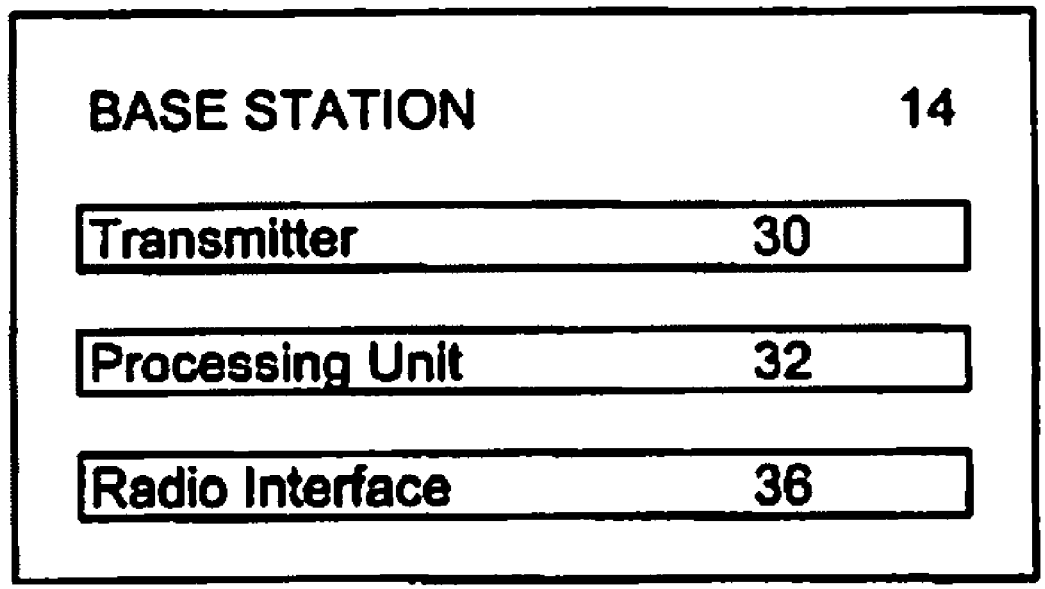
FIG. 6 is a block diagram of a base station of the present invention.

The invention pertains to a base station (BS) 14 of a radio network 16 as shown in FIGS. 4 and 6. The base station comprises a processing unit 32 which assigns a shared Uplink State Flag (USF) value common to all mobile stations capable of shared USF operation, requiring the use of shared USF operation for an uplink temporary block flow (TBF) and having at least one common uplink timeslot for their respective uplink TBFs. The processing unit 32 also assigns the predefined symbol segment(s) within an overall symbol space of a plurality of uplink SUN bursts associated with the shared USF unique to each mobile station within a plurality of mobile stations assigned the use of the same shared USF value. The base station comprises a transmitter 30 in communication with the processing unit 32. The base station comprises a radio interface 36 in communication with the transmitter 30 that transmits the unique predefined symbol segment(s) and shared USF value to each mobile station within a plurality of mobile stations assigned the use of the same shared USF value as part of the signaling procedures performed for initial establishment or ongoing maintenance of an uplink TBF.

The processing unit 32 may recognize when a mobile station assigned the shared USF value has become inactive, and the processing unit 32 responds by reducing scheduling of the mobile station's dedicated USF used for sending user plane payload. The transmitter 30 may use a downlink TBF to transmit over the radio interface 36 payload to a mobile station assigned the shared USF value, where the mobile station has an inactive uplink TBF. The radio interface 36 may receive over the radio interface radio blocks from each of the mobile stations assigned the same shared USF value at essentially a same signal strength level with essentially a same block error rate performance.

The radio interface 36 may receive radio blocks from each of the mobile stations assigned the same shared USF value that are being managed using time alignment parameters that are essentially identical. The radio interface 36 may receive over the radio interface 36 of the base station radio blocks from each of the mobile stations assigned the same shared USF value that are using a same transmission time interval for their respective uplink TBFs. The processing unit 32 may assign each of the mobile stations assigned the same shared USF value a same transmission time interval, a same nominal transmit level and a same modulation scheme for their respective uplink TBFs; and the transmitter 30 transmitting over the radio interface the transmission time interval and nominal transmit level value to each mobile station within the plurality of mobile stations assigned the use of the same shared USF value as part of the signaling procedures performed for initial establishment or ongoing maintenance of an uplink TBF.

The present invention pertains to a method for a mobile station operating within a radio network 16. The method comprises the steps of placing a processing unit 22 of the mobile station into an inactive mode. There is the step of transmitting an activity indication to a base station over a radio interface 26 of the mobile station indicating to the base station that the mobile station has uplink payload to transmit with a transmitter 20 of the mobile station. There is the step of changing the processing unit 22 to active mode. There is the step of transmitting the uplink payload to the base station over the radio interface 26 of the mobile station following the transmission of the activity indication.

There may be the step of receiving over the radio interface 26 of the mobile station a shared Uplink State Flag (USF) value. The first transmitting step may include the step of responding to the shared USF by transmitting an uplink activity indication using one or more predefined symbol segments within an overall symbol space of a plurality of uplink SUN bursts associated with the shared USF. The transmission of an activity indication by the transmitter 20 over the radio interface 26 of the mobile station is also known as the transmission of one or more pre-assigned symbol segments using one or more Shared Uplink Notification Bursts and is used to trigger resumption of legacy (dedicated) USF scheduling by the base station.

There may be the step of receiving over the radio interface 26 of the mobile station a dedicated Uplink State Flag (USF) value. The second transmitting step may include the step of responding to the dedicated USF using a radio block carrying uplink payload according to legacy USF operation, and disabling within a processing unit 22 of the mobile station reception of the shared USF. Disabling the reception of a shared USF means that the processing unit 22 within a given mobile station will not request the transmitter 20 to transmit an activity indication over the radio interface 26 upon reception of a shared USF assigned to that mobile station.

The present invention pertains to a method for a base station of a radio network 16. The method comprises the steps of assigning by a processing unit 32 of the base station a shared USF value common to all mobile stations capable of shared USF operation, requiring the use of shared USF operation for an uplink temporary block flow (TBF) and having at least one common uplink timeslot for their respective uplink TBFs. There is the step of assigning by the processing unit 32 of the base station one or more predefined symbol segments within an overall symbol space of a plurality of uplink SUN bursts associated with a shared Uplink State Flag (USF) unique to each mobile station within a plurality of mobile stations assigned the use of the same shared USF value. There is the step of transmitting over the radio interface 36 of the base station the unique predefined symbol segment(s) and shared USF value to each mobile station within a plurality of mobile stations assigned the use of the same shared USF value as part of the signaling procedures performed for initial establishment or ongoing maintenance of an uplink TBF.

There may be the steps of recognizing with the processing unit 32 when a mobile station assigned a shared USF value has become inactive, and the processing unit 32 responding by reducing scheduling of the mobile station's dedicated USF used for sending user plane payload. There may be the step of transmitting over the radio interface of the base station payload to a mobile station assigned a shared USF value using a downlink TBF, where the mobile station has an inactive uplink TBF.

There may be the step of receiving over the radio interface 36 of the base station radio blocks from each of the mobile stations assigned the same shared USF value at essentially a same signal strength level with essentially a same block error rate performance. There may be the step of receiving over the radio interface 36 of the base station radio blocks from each of the mobile stations assigned the same shared USF value that are being managed using essentially the same time alignment parameters.

There may be the step of receiving over the radio interface 36 of the base station radio blocks from each of the mobile stations assigned the same shared USF value that are using a same transmission time interval for their respective uplink TBFs. There may be the step of the processing unit 32 assigning each of the mobile stations assigned the same shared USF value a same transmission time interval, a same nominal transmit level and a same modulation scheme for their respective uplink TBFs. Additionally, there may be the step of transmitting over the radio interface 36 of the base station the transmission time interval and nominal transmit level value to each mobile station within a plurality of mobile stations assigned the use of the same shared USF value as part of the signaling procedures performed for initial establishment or ongoing maintenance of an uplink TBF.

In the operation of the present invention, the concept of a shared USF is introduced whereby multiple mobile stations may be assigned a shared USF value such that when choosing to respond to such a shared USF, each MS uses one or more pre-defined symbol segments within the overall symbol space of 4 possible uplink bursts, to send the BSS an activity indication that serves to uniquely identify that MS as having an uplink packet service that has once again become active. The number of distinct pre-defined symbol segments that any given uplink burst is broken up into will determine the number of mobile stations that can be assigned the same shared USF value. This is in contrast to legacy USF operation such as within the scope of Dynamic Allocation where a dedicated USF effectively assigns a mobile station the use of 4 specific uplink bursts used exclusively by that mobile station to send an uplink radio block. FIG. 4 shows a representation of the USF scheduling between the base station and a plurality of mobile stations.

Figure 1:
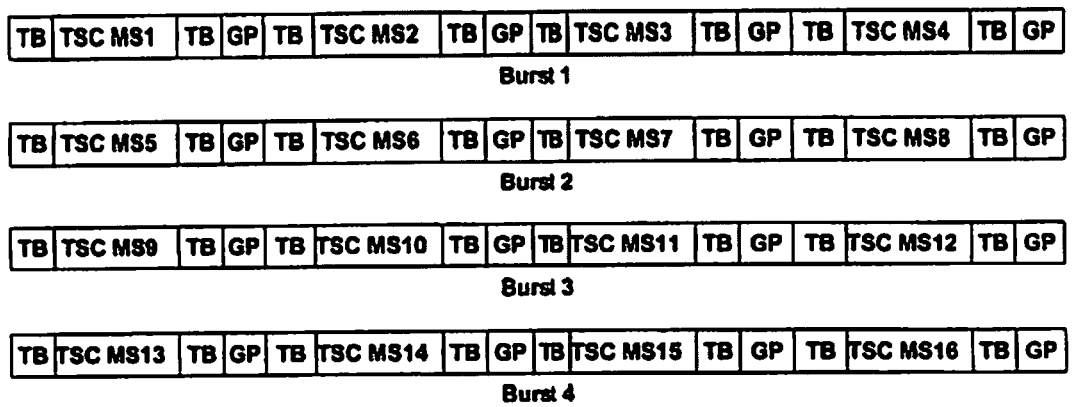
FIG. 1 is a representation of SUN burst formatting of the present invention.

For example, in FIG. 1, each burst corresponding to a shared USF is broken up into 4 distinct MS specific symbol segments (i.e. each symbol segment is represented by a series of multiple contiguous symbols) separated by tail-bit and guard symbols whereby each MS only transmits using the pre-defined symbol segment of the uplink burst it has been assigned within an assignment message (e.g. when MS1 detects its shared USF value and wants to send an indication to the BSS it would transmit a symbol segment during the symbol space spanned by TSC MS1 in burst 1). So assuming 4 such MS specific symbol segments per burst and allowing each of the 4 bursts to be independently assignable to different mobile stations (i.e. only 1 symbol segment is assigned to each mobile station), one instance of a shared USF can result in as many as 16 mobile stations choosing to independently transmit a unique activity indication whenever they have an uplink packet service that has once again become active. The actual bit pattern conveyed during any given instance of TSC may be the same or may be mobile station specific (e.g. the TSC associated with MS1 may be unique to MS1 or a common TSC value may be used by all mobile stations).

A network 16 may transmit a shared USF frequently (e.g. on every instance of a given downlink timeslot) and thereby ensure all mobile stations that have been assigned that shared USF will have at least one unique opportunity within each 20 ms time interval to convey an activity indication using a shared uplink notification burst. By using this shared uplink notification burst (SUNB) feature as described herein, the network 16 can minimize the amount of uplink bandwidth it needs to allocate to inactive mobile station and still ensure the requirements of low delay uplink packet services are satisfied for these mobile stations once they become active on the uplink again. For example, if 10 mobile stations share a USF according to this SUNB feature then there would be about a 90% reduction in the amount of uplink bandwidth the network 16 would otherwise have to allocate for the case where each of these mobile stations was inactive while having a delay sensitive packet service).

The following use cases are supported by the SUNB feature:

Use Case 1:

The initial condition of interest is that where a set of one or more mobile stations are in packet transfer mode with an assigned uplink TBF but are considered to be inactive (i.e. they are not sending uplink user plane payload on the uplink), the BSS has recognized the inactivity of these mobile stations and has therefore significantly reduced the scheduling of MS specific (dedicated) USF (s) needed for sending user plane payload, and each mobile station in the set has previously been assigned a shared USF.

The objective is to provide a more bandwidth efficient means for allowing these mobile stations to quickly resume uplink user plane transmission (i.e. to quickly and reliably send the BSS a notification that normal scheduling of MS specific USF(s) is to be resumed for each mobile station that sends the BSS an activity indication).

The quick resumption of uplink user plane transmission for any mobile station in this set is accomplished by having it send a Boolean to the BSS where this Boolean consists of a training sequence codeword (TSC) which, when received at the BSS with an accuracy meeting a minimum threshold, is considered as a logical "yes" and therefore triggers the resumption of normal scheduling of the MS specific (dedicated) USF(s) by the BSS. The minimum accuracy threshold for a given instance of a TSC to consider as a logical "yes" by the BSS is for further study and may be considered as implementation specific.

Use Case 2:

This use case is where the BSS is transmitting user plane payload to an MS using a downlink TBF where that MS has an inactive uplink TBF (i.e. it has no uplink payload to send).

In this case the MS may detect a problematic radio block on the downlink (e.g. detecting a CRC incorrect RLC data block or receiving an RLC data block with an out of sequence block sequence number) in which case it needs to send the BSS Ack/Nack information as soon as possible.

As such, when the MS detects the next instance of its Shared USF it can transmit a logical "yes" to the BSS using its pre-assigned symbol segment(s) within one or more pre-assigned SUN bursts and thereby trigger the BSS to resume normal scheduling of its dedicated USF (s).

The MS can then respond to its next received dedicated USF by sending the BSS an RLC/MAC control block containing a Packet Downlink Ack/Nack (PDAN) or an RLC data block containing a Piggybacked Ack/Nack (PAN) field and thereby indicate to the BSS which downlink RLC data blocks require re-transmission.

It should be noted that for this use case, each time the MS chooses to transmit nothing in response to receiving an instance of its shared USF, it is effectively stating that there are no downlink radio blocks requiring re-transmission (i.e. in addition to stating that it continues to have no uplink user plane payload to send).

Using the burst format example shown in FIG. 1, up to 16 inactive mobile stations may respond to the reception of their assigned shared USF by sending the BSS a TSC within their respective pre-assigned symbol segment located within a single pre-assignedSUN burst. In the following example each mobile station is assigned a single symbol segment located within a single SUN burst:

MS1 is pre-assigned to transmit during the green shaded portion of SUN burst 1.

MS6 is pre-assigned to transmit during the red shaded portion of SUN burst 2.

MS12 is pre-assigned to transmit during the yellow shaded portion of SUN burst 3.

MS15 is pre-assigned to transmit during the magenta shaded portion of SUN burst 4.

As such, it should be noted that the shared USF is not intended to be used for user plane payload transmission (as per legacy USF operation) but is instead assigned to allow each mobile station in the set to send a distinct Boolean activity indicator (to the BSS) using its pre-defined symbol segment(s) and pre-defined SUN burst(s) (i.e. where the symbol segment to use within each of the 4 SUN bursts is indicated to the MS when the shared USF is assigned to it by the BSS).

Figure 2:
FIG. 2 is a representation of the legacy CSI encoded burst formatting.

In regard to FIG. 2:

TB=Tail Bits (3 symbols long)
GP=Guard Period (8.25 symbols long)
TSC=Training Sequence Codeword (e.g. MUROS TSC, 26 symbols long)
Total Symbols per SUN Burst: 8*3+4*26+4*8.25=161
EP=Encrypted Payload (58 symbols)
LTS—Legacy Training Sequence (26 symbols)
Total Symbols per Legacy CS-1 Encoded Burst: 2*3+2*58+26+8.25=156.25

Reducing TSC size from 26 to 24 symbols per TSC instance will reduce the overall SUN burst size from 161 to 153 symbols and will thereby result in a SUN burst length that is compatible with the legacy CS-1 encoded bursts (i.e. the SUN burst will be 3.25 symbols shorter than the legacy burst but this can be viewed as SUN bursts proving an extra 3.25 symbols of guard space). Other methods for reducing a 161 symbol SUN burst down to a length that is less than or equal to that of a legacy burst includes the possibility of reducing the size of the TB and GP fields.

Note that variations of the uplink bursts corresponding to a shared USF shown in FIG. 1 can be made such that for example SUN bursts 1 and 2 provide distinct Boolean indications for up to 8 mobile stations and SUN burst 3 becomes a repeat of SUN burst 1 and SUN burst 4 becomes a repeat of SUN burst 2 (i.e. in this example each mobile station is assigned two symbol segments where the first segment is located within SUN burst 1 or 2 and the second segment is located within SUN burst 3 or 4). Note that if a mobile station is assigned two symbol segments then bit interleaving between SUN bursts 1 and 3 and SUN bursts 2 and 4 is possible where this interleaving could be done in the interest of potentially enhancing the robustness associated with which each TSC conveyed to the BSS. Whether or not such enhanced robustness is really required is for further study.

Figure 3:
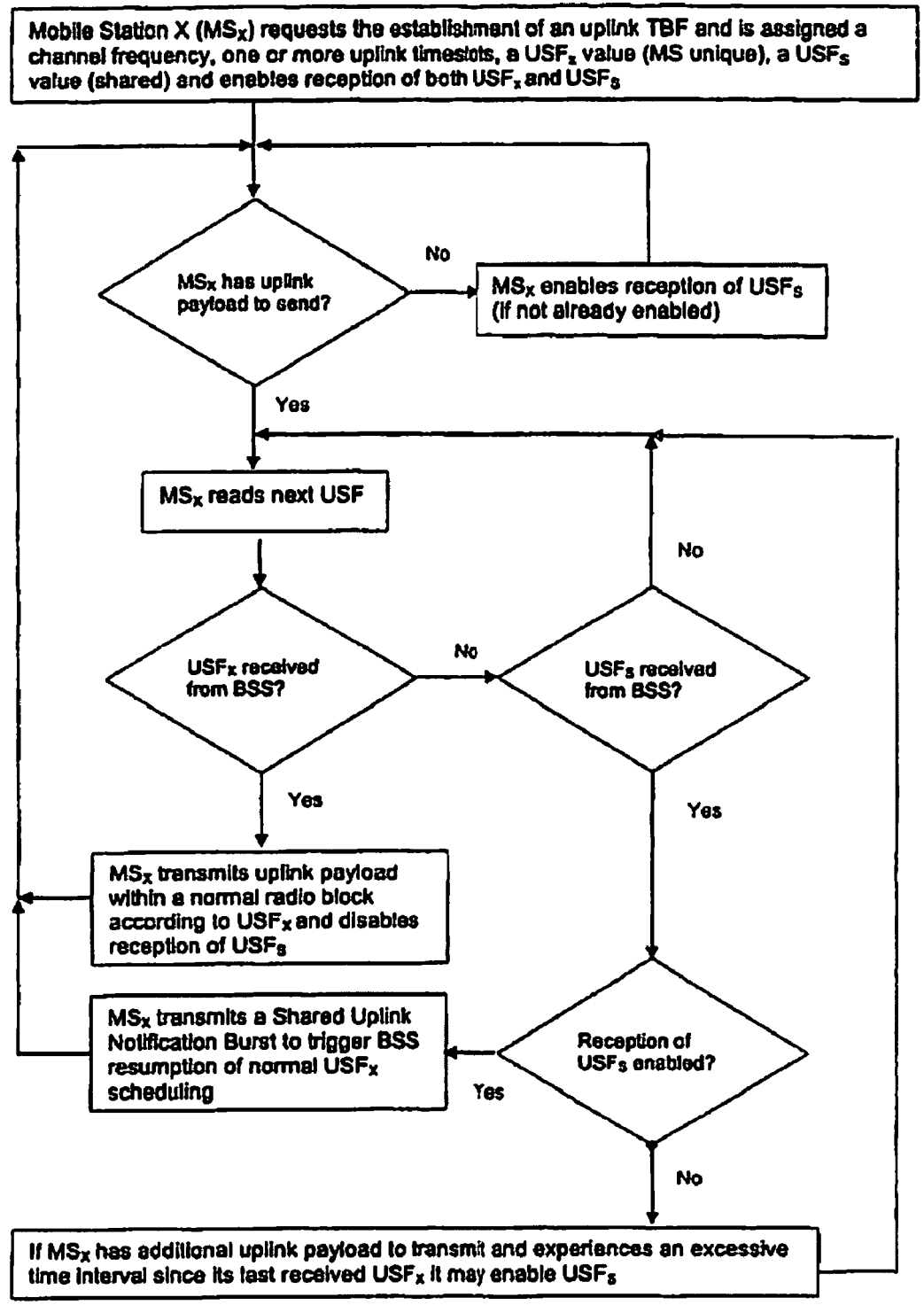
FIG. 3 is a flowchart of the USF processing logic regarding the present invention.

Grouping of Mobile Stations:

With reference to FIG. 3, the method that a serving BSS uses to determine the set of mobile stations to assign a shared USF is implementation specific. However, since these mobile stations are indented to share at least one common uplink and downlink carrier some of the following factors could be taken into account by the BSS when deciding which set of mobile stations can be assigned a shared USF:

Each candidate MS is being received by the serving BSS at similar signal strength levels with similar block error rate (BLER) performance.

Each candidate MS is being managed using similar time alignment parameters.

Each candidate MS is using the same transmission time interval (TTI) for the uplink TBF(s) for which they share one or more common timeslots (i.e. BTTI or RTTI).

Each candidate MS has been assigned the same nominal transmit level and the same modulation scheme for their ongoing uplink TBF(s).

Assignment of Shared USF:

Upon determining that it has one or more mobile stations that could be grouped (e.g. using some of the factors listed above), the serving BSS may then decide to have them operate using the SUNB feature according to the following:

1. At power up (or any time thereafter) an MS indicates to the serving BSS whether or not it supports the SUNB feature (e.g. using the MS Radio Access Capabilities information element).

2. When the serving BSS determines that the SUNB feature is to be used it uses PACCH based TBF assignment messages to inform each MS sharing a USF about the following:

The shared USF value to use. The USF granularity necessarily defaults to 1 and Dynamic Allocation is always used.

The specific symbol segment within each SUN burst assigned to an MS.

A specific set of symbols the MS is to actually transmit using its assigned symbol segment or a default set of symbols can be assumed in the absence of this information.

Detecting a Shared USF:

An active mobile station with a shared USF assignment responds to its dedicated USF(s) by transmitting uplink RLC data blocks according to the transmission opportunities corresponding to each of its received dedicated USFs (i.e. it operates according to legacy uplink TBF rules). Upon detecting a shared USF an active MS may still use the shared USF as an opportunity to send an activity notification to the BSS (e.g. indicate to the BSS that additional uplink bandwidth should be allocated to its ongoing uplink TBF or if it determines that it has not received its dedicated USF for a certain amount of time while it continues to be in active mode). The transmission of an activity indication to the base station is also known as the transmission of one or more pre-assigned symbol segments using one or more Shared Uplink Notification Bursts.

If an MS with a shared USF assignment goes inactive (i.e. it fails to transmit payload using transmission opportunities provided by its dedicated USF(s)), the BSS may respond by significantly reducing the scheduling of its dedicated USF(s) and thereby increase the efficiency with which the available uplink bandwidth is used. When this happens, the inactive MS will monitor its shared USF and may choose to simply ignore any transmission opportunities provided by that shared USF if it has no uplink payload to send (i.e. the BSS will consider the absence of a TSC within its pre-defined symbol segment (s) and SUN burst(s) corresponding to that MS as a logical "no" indication and therefore not resume normal scheduling of the dedicated USF(s) corresponding to that MS).

At some point an inactive MS may become active again and will therefore respond by looking for the next shared USF based transmission opportunity and transmitting an activity indication (using its pre-defined symbol segment(s) and SUN burst(s)) that triggers the BSS to resume normal scheduling of its dedicated USF(s). As such, the TSC the MS transmits using its pre-defined symbol segment(s) and SUN burst(s) serves as a logical "yes" indication to BSS. Note that the BSS may determine that a logical "yes" indication within any given TSC symbol segment only if a certain minimum accuracy of the TSC is experienced. Exactly what this minimum TSC accuracy requirement consists of is for further study and may be considered as implementation specific.

The SUNB feature described herein is seen as having value added for the two use cases described above. With this SUNB feature a high level of robustness is expected regarding the proposed mechanism for conveying logical "yes" or "no" indications to the BSS. The simplicity and anticipated robustness of this mechanism in turn allows for multiple mobile stations to uniquely and independently convey these "yes" and "no" indications and as such, the amount of uplink bandwidth required by the BSS to support mobile stations with inactive uplink packet services can be significantly reduced (i.e. compared to the case where the SUNB feature is not used).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for a mobile station operating within a radio network comprising the steps of:
   receiving over the radio interface of the mobile station a shared Uplink State Flag (USF) value;
   placing a processing unit of the mobile station that has the shared USF value into an inactive mode;
   transmitting an indication to a base station over a radio interface of the mobile station that there is uplink payload to transmit with a transmitter of the mobile station;
   changing the processing unit to active mode; and
   transmitting the uplink payload to the base station over the radio interface of the mobile station, wherein the first transmitting step includes the step of responding to the shared USF using a predefined symbol segment within an overall symbol space of a plurality of uplink shared uplink notification bursts (SUNB) associated with the shared USF.

2. A method for a mobile station operating within a radio network comprising the steps of:
   placing a processing unit of the mobile station that has a shared USF value into an inactive mode;
   transmitting an indication to a base station over a radio interface of the mobile station that there is uplink payload to transmit with a transmitter of the mobile station;
   changing the processing unit to active mode;
   receiving over the radio interface of the mobile station a dedicated Uplink State Flag (USF) value; and
   transmitting the uplink payload to the base station over the radio interface of the mobile station, wherein the second transmitting step includes the step of responding to the dedicated USF using a radio block carrying uplink payload according to legacy USF operation, and disabling within a processing unit of the mobile station reception of the shared USF.

3. A mobile station (MS) operating within a radio network comprising:
   a processing unit having an active mode and an inactive mode;
   a transmitter in communication with the processing unit;
   a memory in communication with the processing unit for storing uplink payload; and
   a radio interface in communication with the radio network and the transmitter wherein the radio interface receives a shared Uplink State Flag (USF) value assigned to the MS; when the processing unit determines there is uplink payload to transmit when the processing unit is in the inactive mode, the processing unit informs the transmitter that new uplink payload is available, the transmitter transmitting an activity indication to a base station over the radio interface, the processing unit changing to active mode, and the transmitter transmitting the uplink payload to the base station over the radio interface, wherein the transmitter responds through the radio interface to the shared USF using one or more predefined symbol segments within an overall symbol space of a plurality of uplink shared uplink notification bursts (SUNB) associated with the shared USF.

4. A mobile station (MS) operating within a radio network comprising:
   a processing unit having an active mode and an inactive mode;
   a transmitter in communication with the processing unit;
   a memory in communication with the processing unit for storing uplink payload; and
   a radio interface in communication with the radio network and the transmitter wherein the radio interface receives a dedicated Uplink State Flag (USF) value assigned to the MS; when the processing unit determines there is uplink payload to transmit when the processing unit is in the inactive mode, the processing unit informs the transmitter that new uplink payload is available, the transmitter transmitting an activity indication to a base station over the radio interface, the processing unit changing to active mode, and the transmitter transmitting the uplink payload to the base station over the radio interface, wherein the transmitter responds through the radio interface to the dedicated USF using a radio block carrying uplink payload according to legacy USF operation, and the processing unit disables reception of the shared USF.

* * * * *